(12) United States Patent
van Berge et al.

(10) Patent No.: US 6,455,462 B2
(45) Date of Patent: Sep. 24, 2002

(54) IMPREGNATION PROCESS FOR CATALYSTS

(75) Inventors: Peter Jacobus van Berge, Vaalpark (ZA); Jan van de Loosdrecht, Vaalpark (ZA); Elsie Adriana Caricato, Sasolburg (ZA); Sean Barradas, Parys (ZA); Bulelani Humphrey Sigwebela, Sasolburg (ZA)

(73) Assignee: (Sasol Technology (Proprietary) Limited), Johannesburg (ZA)

(*) Notice: Subject to any disclaimer, the term of this patent is extended or adjusted under 35 U.S.C. 154(b) by 0 days.

(21) Appl. No.: 09/822,781

(22) Filed: Mar. 30, 2001

Related U.S. Application Data (63) Continuation-in-part of application No. PCT/IB99/01626, filed on Oct. 4, 1999.

(30) Foreign Application Priority Data

Oct. 5, 1998 (ZA) .............................................. 98/9056
Dec. 10, 1998 (ZA) ............................................. 98/11334

(51) Int. Cl.$^7$ .......................... B01J 23/00; B01J 23/40; B01J 23/42; C07C 27/00; C07C 27/06
(52) U.S. Cl. ...................... 502/325; 502/326; 502/327; 502/355; 518/715
(58) Field of Search ............................... 502/325–327, 502/355; 518/715

(56) References Cited

U.S. PATENT DOCUMENTS

| 4,568,663 A | | 2/1986 | Mauldin ...................... 502/325 |
| 4,801,573 A | * | 1/1989 | Eri et al. ..................... 502/302 |
| 5,102,851 A | * | 4/1992 | Eri et al. ..................... 502/302 |
| 5,140,050 A | | 8/1992 | Mauldin et al. ............. 518/715 |
| 5,424,262 A | | 6/1995 | de Lasa et al. ............... 502/64 |
| 5,733,839 A | * | 3/1998 | Espinoza et al. ........... 502/336 |

FOREIGN PATENT DOCUMENTS

| EP | 0313375 | 4/1989 |
| EP | 0736326 | 10/1996 |
| EP | 0764464 | 3/1997 |
| WO | 9837168 | 8/1998 |
| WO | 9942214 | 8/1999 |

OTHER PUBLICATIONS

Moulijn, J.A. et al. "Preparation of Supported Catalysts" An Integrated Approach to Homogeneous, Heterogeneous and Industrial Catalysis (Elsevier Science Publishers B.U.—1993) Chapter 9, PP 335–360 no month available.

Derwent Abstract J57130934 Date Aug. 13, 1982 XP–002129660.

* cited by examiner

*Primary Examiner*—Mark L. Bell
*Assistant Examiner*—Patricia L. Hailey
(74) *Attorney, Agent, or Firm*—Ladas & Parry (57) ABSTRACT

A process for preparing a catalyst precursor including subjecting, in an initial treatment stage, a slurry of a catalyst support, an active catalyst component precursor, and water, to treatment at elevated temperature and at sub-atmospheric pressure, to impregnate the support with the precursor and to dry the impregnated support partially. The initial treatment stage does not continue beyond a point where the impregnated carrier has a LOI which is less than 1.2 $LOI_{iw}$. In a subsequent treatment stage, the partially dried impregnated support is subjected to more vigorous drying at elevated temperature and at sub-atmospheric pressure to obtain a dried impregnated carrier, which is calcined to obtain the catalyst precursor. The catalyst precursor is reduced, to obtain a catalyst.

14 Claims, 3 Drawing Sheets

IMPREGNATION PROCESS FOR CATALYSTS

This application is a continuation-in-part of application Ser. No. PCT/IB99/01626, filed Oct. 4, 1999.

THIS INVENTION relates to catalysts. It relates in particular to a process for preparing a catalyst precursor.

According to a first aspect of the invention, there is provided a process for preparing a catalyst precursor, which process comprises subjecting, in an initial treatment stage, a slurry comprising a porous oxidic catalyst support or carrier, an active catalyst component or its percursor, and water, to treatment at elevated temperature and at sub-atmospheric pressure such that impregnation of the support or carrier with the active catalyst component or its precursor and partial drying of the impregnated support or carrier occurs, with the initial treatment stage not continuing beyond a point where the impregnated carrier or support has a loss on ignition (LOI) which is less than 1.2 times its loss on ignition at incipient wetness ($LOI_{iw}$);

thereafter, in a subsequent treatment stage, subjecting the partially dried impregnated support or carrier to treatment at elevated temperature and at sub-atmospheric pressure such that the temperature in the subsequent treatment stage exceeds that in the initial treatment stage and/or the sub-atmospheric pressure in the subsequent treatment stage is lower than that in the initial treatment stage, thereby to obtain more vigorous drying of the impregnated support or carrier in the subsequent treatment stage than in the initial treatment stage, with a dried impregnated carrier or support thereby being produced; and calcining the dried impregnated carrier or support, to obtain the catalyst precursor.

The resultant catalyst precursor is, in practice, subjected to reduction, in order to obtain a catalyst.

The porous oxidic catalyst support may, in particular form. In principle, any commercially available oxidic catalyst support can be used. Examples of catalyst supports that can be used are alumina ($Al_2O_3$) and titania ($TiO_2$). The support preferably has an average pore diameter between 8 and 50 nanometers, more preferably between 10 and 15 nanometers. The support pore volume may be between 0.1 and 1 ml/g, preferably between 0.3 and 0.9 ml/g. The average particle size may be between 1 and 500 micrometers, preferably between 10 and 250 micrometers, still more preferably between 45 and 200 micrometers. Alumina is preferred as the support, and the invention is described further hereunder with reference to alumina as the suport.

While the active catalyst component can, at least in principle, be any known Fischer-Tropsch active component such as cobalt (Co), iron (Fe), nickel (Ni) or ruthenium (Ru); however, cobalt (Co) is preferred. In particular, a cobalt precursor can be used. Still more particularly, cobalt nitrate ($Co(NO_3)_2 \cdot 6H_2O$) is preferably used.

From 1.18xy to 1.82xy kg $Co(NO_3)_2 \cdot 6H_2O$ may initially be used in the initial treatment stage, where x is the BET pore volume of the alumina support in ml/g, and y is the mass of alumina support to be impregnated, in kg.

The process may include initially dissolving the $Co(NO_3)_2 \cdot 6H_2O$ in the water, which is preferably distilled water. Sufficient water may be used such that the volume of the solution is greater than xyl, and preferably is about 2xyl.

In one version of the invention, this solution may be heated to a temperature between 60° C. and 95° C., with the support then being added to the solution at atmospheric pressure, to form the slurry. The slurry may be mixed, preferably on a continuous basis, eg by means of an internal rotating screw in a conical vacuum drier in which the slurry is held.

In the initial treatment stage, vacuum may then gradually be applied to the slurry, preferably under continuous mixing, eg stirring, thereof, at a temperature between 60° C. and 95° C., which may be the same as the temperature to which the solution is initially heated, or different therefrom. This constitutes the initial treatment of the slurry, and it is important that the initial treatment be effected in a gradual manner, ie excessive boiling of the slurry is to be avoided.

The sub-atmospheric pressure or vacuum that is applied during the initial treatment stage may be down to 20 kPa(a), ie between atmospheric pressure and 20 kPa(a). Typically, the vacuum may be about 20 kPa(a) for a slurry temperature of 60° C., and about 83 kPa(a) for a slurry temperature of 95° C.

The initial treatment stage is preferably continued until the loss on ignition (LOI) of the impregnated alumina support is 1.2 times $LOI_{iw}$, ie 1.2 times the LOI at the point of incipient wetness (iw). Incipient wetness occurs when all the pores of the support are filled with liquid and there is no excess moisture, over and above the liquid required to fill the pores, present. Typically, the initial treatment time will be up to 3 hours or more.

Loss on ignition (LOI) is defined as the mass % loss observed during complete calcination, ie during decomposition to $Co_3O_4/Al_2O_3$, experimentally to be determined as the mass % loss observed during calcination at 400° C., ie at a temperature sufficiently high to ensure quantitative decomposition of cobalt nitrate to $Co_3O_4$, but too low in order to effect the undesired formation of cobalt aluminates.

The LOI value at the state of incipient wetness, ie $LOI_{iw}$, can be expressed as a function of the pore volume of the support as well as the amount of catalyst active component to be impregnated. The pore volume of the support, prior to impregnation, is as stated hereinbefore, equal to x ml/g. The amount of $Co(NO_3)_2 \cdot 6H_2O$ to be impregnated is M gram per gram of support material, and will fall within the range: 1.18 x to 1.82 x gram per gram support material. M is thus determined by the amount of $Co(NO_3)_2 \cdot 6H_2O$ initially used. The LOI value at the state of incipient wetness can be calculated as follows:

$$LOI_{iw}=100\ ((0.20M+x)/(0.475M+x+1)) \quad (1)$$

This shows that the LOI at the state of incipient wetness is dependent on the pore volume of the support and the amount of $Co(NO_3)_2 \cdot 6H_2O$ used for the catalyst preparation.

The gradual drying procedure until the LOI is 1.2 times $LOI_{iw}$ ensures that about 83% of the cobalt nitrate is quantitatively drawn into the pores of the alumina support without the occurrence of localized saturation, which results in premature crystallization of cobalt nitrate.

At a moisture point somewhat above incipient wetness, ie when LOI of the impregnated alumina support is 1.2 times $LOI_{iw}$, aggressive evacuation, eg increased vacuum pump suction capacity when a vacuum pump is used, may be applied, in the subsequent treatment stage; at the same time, it is ensured that the support temperature is controlled at between 60° C. and 95° C. Thus, when a vacuum drier, in which the impregnated support is contained in the of a bed, is used, an increased setting of the vacuum drier wall temperature is used, thereby ensuring that the bed temperature is controlled between 60° C. and 95° C., under continuous mixing, eg stirring. This constitutes the subsequent treatment in which more forceful drying of the impregnated support takes place. Once the point where LOI=1.2 times $LOI_{iw}$ has been reached, the more forceful vacuum drying during the subsequent treatment stage preferably proceeds in an uninterrupted fashion, preferably at the conditions:

>60° C., but not higher than 95° C., and at the minimum pressure which is attainable, with this pressure being <20 kPa(a)

Vacuum drying under these specific conditions should be maintained until a clearly defined maximum required LOI value is reached, which value depends on the need to store the dried material for a certain period of time before calcination can be executed, as hereinafter described, and this maximum required LOI value is smaller than, or equal to, 0.90 times $LOI_{iw}$.

The calcination of this dried impregnated support may be effected in a fluidized bed, or a rotary kiln, calciner at a temperature from 200° C. to 300° C., preferably at about 250° C.

The process thus involves using a slurry, ie an excess of moisture, to achieve impregnation of the support; thereafter drying the impregnated support in a gradual manner during the initial treatment stage until 1.2 times $LOI_{iw}$; whereafter the more forceful drying of the subsequent treatment stage is effected until the maximum required LOI value is attained.

Sufficient cobalt nitrate may initially be used to obtain a cobalt loading between 5 g Co/100 g support and 70 g Co/100 g support, preferably between 20 g Co/100 g support and 40 g Co/100 g support, more preferably between 25 g Co/100 g support and 35 g Co/100 g support.

The maximum cobalt loading attainable in a single support impregnation step as hereinbefore described is as given in Table 1:

TABLE 1

Correlation between pore volume and maximum attainable cobalt loading

| Pore volume of support (ie prior to the first impregnation step) | Maximum attainable cobalt loading |
| --- | --- |
| 0.90 ml/g | 32.4 g Co/100 g $Al_2O_3$ |
| 0.89 ml/g | 32.0 g Co/100 g $Al_2O_3$ |
| 0.88 ml/g | 31.7 g Co/100 g $Al_2O_3$ |
| 0.87 ml/g | 31.3 g Co/100 g $Al_2O_3$ |
| 0.86 ml/g | 31.0 g Co/100 g $Al_2O_3$ |
| 0.85 ml/g | 30.6 g Co/100 g $Al_2O_3$ |
| 0.84 ml/g | 30.2 g Co/100 g $Al_2O_3$ |
| 0.83 ml/g | 29.9 g Co/100 g $Al_2O_3$ |
| 0.82 ml/g | 29.5 g Co/100 g $Al_2O_3$ |
| 0.81 ml/g | 29.2 g Co/100 g $Al_2O_3$ |
| 0.80 ml/g | 28.8 g Co/100 g $Al_2O_3$ |

The optimum cobalt loading is defined as the maximum cobalt loading at which the cobalt utilization is still optimum. In the case of the Fischer-Tropsch application of a $Co/Al_2O_3$ catalyst, it was determined that a direct proportionality between cobalt loading and catalyst productivity existed up to a cobalt loading of 30 g Co/100 g $Al_2O_3$, for a $Al_2O_3$ support material with a pore volume of about 0.5 ml/g, and an average pore diameter of 12 nanometer.

It is clear from Table 1 that an optimum cobalt loading of 30 g Co/100 g $Al_2O_3$ cannot be achieved on a $Al_2O_3$ support material with a pore volume of 0.5 ml/g, in a single impregnation step. In order to achieve a cobalt loading of 30 g Co/100 g $Al_2O_3$ in a single impregnation step, an $Al_2O_3$ support material with a minimum pore volume of 0.84 ml/g is required. In accordance with the invention, the calcined catalyst precursor obtained from the abovementioned initial or first impregnation step (ie 18.4 g Co/100 g $Al_2O_3$ in the case of a support material with a pore volume of 0.5 ml/g), must be subjected to a further impregnation, drying and calcination in a second impregnation step. The second impregnation step may then comprise subjecting, in an initial treatment stage, a slurry comprising the calcined material of the first impregnation step, an active catalyst component or its precursor, and water, to treatment at elevated temperature and at sub-atmospheric pressure such that impregnation of the calcined material with the active catalyst component or its precursor and partial drying of the impregnated material occurs, with the initial treatment stage not continuing beyond a point where the impregnated material has a LOI which is less than 1.2 times its $LOI_{iw}$;

thereafter, in a subsequent treatment stage, subjecting the partially dried impregnated material to treatment at elevated temperature and at sub-atmospheric pressure such that the temperature in the subsequent treatment stage exceeds that in the initial treatment stage and/or the sub-atmospheric pressure in the subsequent treatment stage is lower than that in the initial treatment stage, thereby to obtain more vigorous drying of the impregnated material in the subsequent treatment stage than in the initial treatment stage, with a dried impregnated material thereby being produced; and calcining the dried impregnated material, to obtain the catalyst precursor.

As also stated hereinbefore, the catalyst precursor is, in practice, reduced, to obtain a catalyst.

When a $Co(NO_3)_2 \cdot 6H_2O$ precursor is used in the first impregnation step, then the same precursor is preferably used in the second impregnation step. The amount of $Co(NO_3)_2 \cdot 6H_2O$ used during the second impregnation step may be from $1.18x_1y_1$ to $1.82x_1y_1$ kg where $x_1$ is the BET pore volume of the calcined material from the first impregnation step, in ml/g, and $y_1$ is the mass of calcined material from the first impregnation step to be impregnated in the second impregnation step, in kg. This range of cobalt nitrate allows for a limited flexibility with respect to the cobalt loading of the resultant catalyst to be broadened by support tailoring. For example, when alumina is initially used as the support material, Table 2 provides the correlation between the pore volume of the starting alumina, ie x ml/g, and the empirically derived maximum attainable cobalt loading in a two-step impregnation procedure as hereinbefore described.

TABLE 2

Correlation between pore volume and maximum attainable cobalt loading

| Pore volume of support (ie prior to the first impregnation step) | Maximum attainable cobalt loading |
| --- | --- |
| 0.50 | 35.5 g Co/100 g $Al_2O_3$ |
| 0.49 | 34.7 g Co/100 g $Al_2O_3$ |
| 0.48 | 33.9 g Co/100 g $Al_2O_3$ |
| 0.47 | 33.1 g Co/100 g $Al_2O_3$ |
| 0.46 | 32.4 g Co/100 g $Al_2O_3$ |
| 0.45 | 31.6 g Co/100 g $Al_2O_3$ |
| 0.44 | 30.8 g Co/100 g $Al_2O_3$ |
| 0.43 | 30.1 g Co/100 g $Al_2O_3$ |
| 0.42 | 29.3 g Co/100 g $Al_2O_3$ |
| 0.41 | 28.6 g Co/100 g $Al_2O_3$ |
| 0.40 | 27.8 g Co/100 g $Al_2O_2$ |

For example, if the objective is a final catalyst having a cobalt loading of 30 g Co/100 g $Al_2O_3$, the starting alumina support must have a pore volume $\geq 0.43$ ml/g.

This amount of cobalt nitrate may initially be dissolved in water, which is preferably distilled water. Sufficient water may be used such that the volume of the solution is $>x_1y_1l$, preferably about $2x_1y_1l$. This solution may then be heated to a temperature between 60 and 95° C. To this solution, the final inventory of $y_1$ kg of the first impregnation step material, ie the catalyst precursor of the first impregnation and calcination step, may be added at atmospheric pressure, whilst continuous mixing of the slurry is maintained, eg by means of an internal rotating screw in a conical vacuum drier.

In the initial treatment stage of the second impregnation step, vacuum may then gradually be applied to the slurry, preferably under continuous mixing, eg stirring, thereof, at a temperature between 60° C. and 95° C., which may be the same as the temperature to which the solution is initially heated, or different therefrom. This constitutes the initial treatment stage of the slurry, and it is important that the initial treatment be effected in a gradual manner, ie excessive boiling of the slurry is to be avoided.

The initial treatment stage of the second impregnation step is preferably continued until the LOI of the impregnated material is reduced to a point where it is 1.2 times $LOI_{iw}$. Typically, the initial treatment time will be up to 3 hours or more.

The sub-atmospheric pressure or vacuum that is applied during the initial treatment stage may be down to 20 kPa(a), ie between atmospheric pressure and 20 kPa(a). Typically, the vacuum may be about 20 kPa(a) for a slurry temperature of 60° C. and about 83 kPa(a) for a slurry temperature of 95° C.

As stated hereinbefore, this gradual drying procedure until the LOI is 1.2 times $LOI_{iw}$ ensures that about 83% of the cobalt nitrate is quantitatively drawn into the pores of the calcined material without the occurrence of localized saturation, which results in premature crystallization of cobalt nitrate. At a moisture point somewhat above incipient wetness, ie at the point where LOI is 1.2 times $LOI_{iw}$, aggressive evacuation, eg increased vacuum pump suction capacity when a vacuum pump is used, may be applied, in the subsequent treatment stage of the second impregnation step; at the same time, it is ensured that the support temperature is controlled at between 60° C. and 95° C. Thus, when a vacuum drier, in which the impregnated material is contained in the form of a bed, is used, an increased setting of the vacuum drier wall temperature is used, thereby ensuring that the bed temperature is controlled between 60° C. and 95° C., under continuous mixing, eg stirring. Preferably, maximum vacuum (<20 kPa(a)) is applied, whilst simultaneously ensuring that the bed temperature does not drop below 60° C., under continuous mixing. This constitutes the subsequent treatment stage. Once the point where LOI=1.2 times $LOI_{iw}$ has been reached, vacuum drying during the subsequent treatment stage preferably proceeds in an uninterrupted fashion, preferably at the conditions:

>60° C., but not higher than 95° C., and at the minimum pressure which is attainable, with this pressure being <20 kPa(a).

Vacuum drying under these specific conditions should be maintained until a clearly defined maximum LOI value is reached, which value depends on the need to store the dried material for a certain period of time before calcination can be executed, as hereinafter described, and this maximum required LOI value is smaller than, or equal to, 0.90 times $LOI_{iw}$.

The calcination of this dried impregnated material may be effected in a fluidized bed, or a rotary kiln, calciner at a temperature from 200° C. to 300° C., preferably at about 250° C.

During the first treatment stage of the first impregnation step and/or during the first treatment stage of the second impregnation step, a water soluble precursor salt of palladium (Pd) or platinum (Pt) may be added, as a dopant capable of enhancing the reducibility of the active component. The mass proportion of the palladium or platinum metal to the cobalt metal may be between 0.01:100 to 0.3:100.

It has hitherto generally be known to those skilled in the art that high drying rates during catalyst support impregnation and drying will result in catalysts with a homogeneous macroscopic distribution of the active component in the catalyst particles, ie an absence of an eggshell distribution.

Surprisingly, it has now been found that even if the macroscopic distribution of the active component is very homogeneous, controlling the drying rate of the slurry to a specified drying profile from the point of 1.2 times $LOI_{iw}$ during the first and second impregnation steps, a catalyst with a more desired activity, is consistently obtained. The slope of the drying profile, ie the drying rate, at the point of incipient wetness should preferably be greater than (0.048 $h^{-1}$) $LOI_{iw}$. The slope of the drying profile is determined at the point of incipient wetness. This may be done by matching the experimental data to an empirical equation, eg y=a 1nx+b, and calculating the derivative at the point of incipient wetness. After having determined a suitable equation to fit the experimental data, this type of equation should be used exclusively to calculate the drying rate, ie the tangent at the point of incipient wetness, for all drying profiles.

The impregnation and drying of the catalyst support in the sub-atmospheric environment, ie the initial and subsequent treatment stages of the first and second impregnation steps, can be performed in, for example, a conical vacuum drier with rotating screw or a tumbling vacuum drier, preferably a conical vacuum drier. The desired drying profile can be achieved by decreasing the sub-atmospheric pressure, by more efficient mixing, by increasing the temperature of the vacuum drier wall, or by the introduction of hot air during the subsequent treatment stage, but preferably is achieved by more efficient mixing.

It has also hitherto generally been known to those skilled in the art that the impregnated and dried material need not necessarily be calcined immediately after impregnation and drying thereof. A less desired catalyst activity has, however, been observed if storage occurred between the catalyst support impregnation/drying and product calcination.

Surprisingly, it has now been found that if the drying profile in accordance with the invention is met during the subsequent treatment stages, and drying is immediately continued under the sub-atmospheric pressure at temperatures between 60° C. and 95° C. to LOI values lower than $0.9\ LOI_{iw}$, the maximum allowable storage time at ambient conditions in a dry environment between the catalyst support impregnation/drying and the catalyst precursor calcination is a direct function of $LOI_{unload}$, ie the LOI at which the impregnated support drying, ie the subsequent treatment stage, was trminated and the dried impregnated material unloaded from the vacuum drying equipment. The maximum allowable storage time before calcination should preferably be less than $((-8.1/LOI_{iw})LOI_{unload}+26.2)$ hours, which thus results in a catalyst that has a more desired activity.

Instead of, in the first and/or the second step, heating the solution of cobalt nitrate in water to the temperature between 60° C. and 95° C. and then adding the particulate support thereto, the support may be added to the solution at ambient temperature, whereafter the temperature of the slurry is increased to a minimum of 60° C. and a maximum of 95° C. prior to evacuation to a vacuum of ≧20 kPa(a). During the initial treatment, the temperature may then be increased slowly, to ensure that the gradual treatment, ie without excessive boiling of the slurry, is effected. Once the stage described by LOI=1.2 times $LOI_{iw}$ has been reached, more vigorous treatment is effected by aiming for a slurry temperature ≧60° C., preferably 95° C., whilst applying maximum allowable suction capacity affordable by the vacuum pump, effecting a drying rate in excess of $(0.048 \text{ h}^{-1}) LOI_{iw}$.

The catalyst obtained is particularly suitable for use as a Fischer-Tropsch catalyst to catalyze the Fischer-Tropsch reaction of a synthesis gas, comprising hydrogen and carbon monoxide, to produce Fischer-Tropsch products.

The invention will now be described in more detail with reference to the accompanying drawings as well as the following non-limiting examples.

In the Examples, all the catalysts were prepared in an identical manner as regards their impregnation and calcination. However, in the different examples the drying mechanism and storage time between the drying and calcination were varied, in order to ascertain the optimum values thereof.

EXAMPLE 1

An alumina supported cobalt catalyst precursor was prepared according to the process of the invention. A solution of 17.4 kg of $Co(NO_3)_2 \cdot 6H_2O$, 9.6 g of $(NH_3)_4Pt(NO_3)_2$, and 11 kg of distilled water was mixed with 20.0 kg of a gamma alumina support (Puralox SCCa 5/150, pore volume of 0.48 ml/g, from Condea Chemie GmbH of Uberseering 40, 22297 Hamburg, Germany) by adding the support to the solution. In a first impregnation step, the slurry was added to a conical vacuum drier and continuously mixed. The temperature of this slurry was increased to 60° C. after which a vacuum of 20 kPa(a) was applied. During the first 3 hours of drying, ie during an initial treatment stage, the temperature was increased slowly and reached 95° C. after 3 hours. The $LOI_{iw}$ was calculated by using Equation 1, and applying 0.48 (ml/g) for x and 0.87 (g $Co(NO_3)_2 \cdot 6H_2O$ per gram alumina) for M. This gives a $LOI_{iw}$ of 35%. The LOI values of samples of the impregnated material were determined by calcining a sample, taken from the vacuum drier during the impregnation/drying stage, at 400° C. in air for 10 minutes. At 400° C. all cobalt nitrates will decompose, without forming cobalt aluminate, and resulting in $Co_3O_4/Al_2O_3$. The LOI after 3 hours was 42.1%, ie $1.20LOI_{iw}$. Thereafter, ie during a subsequent treatment stage, the drying was performed more aggressively, ie the pressure was decreased to 7 kPa(a). After 6 hours, as determined from the start of the initial treatment stage, the LOI was found to be 30.7%, ie $0.88LOI_{iw}$. After reaching a LOI value of 25.7%, ie $0.73LOI_{iw}$, the subsequent treatment stage was terminated and the dried impregnated support was calcined immediately at 250° C. To obtain a catalyst with a cobalt loading of 30 g Co/100 g $Al_2O_3$, a second impregnation step was performed. A solution of 9.4 kg of $Co(NO_3)_2 \cdot 6H_2O$, 15,7 g of $(NH_3)_4Pt(NO_3)_2$, and 15.1 kg of distilled water was mixed with 20.0 kg of the calcined material from the first impregnation step, by adding the calcined material to the solution. The temperature of this slurry was increased to 60° C. after which a vacuum of 20 kPa was applied. The $LOI_{iw}$ can again be calculated by using Equation 1, and applying 0.36 (ml/g) (measured) for $x_1$ and 0.47 (g $Co(NO_3)_2 \cdot 6H_2O$ per gram alumina) for M. This results in a $LOI_{iw}$ of 29%. During the first 3 hours of drying, ie during an initial treatment stage of the second impregnation step, the temperature was increased slowly and reached 95° C. after 3 hours. The LOI after 3 hours was 37.0%, ie $1.28LOI_{iw}$. Thereafter, ie during a subsequent treatment stage of the second impregnation step, the drying was performed more aggressively, ie the pressure was decreased to 7 kPa(a). After 6 hours, as determined from the start of the initial treatment stage of the second impregnation step, the LOI was 26.8%, ie $0.92LOI_{iw}$. After reaching a LOI value of 20.5%, ie $0.71LOI_{iw}$, this subsequent treatment stage was terminated and the resultant dried impregnated material was calcined immediately at 250° C., to obtain a catalyst precursor.

EXAMPLE 2

A catalyst precursor was prepared according to Example 1 except that the dried impregnated material was stored in a dry environment at ambient temperature for 48 hours after each impregnation step, before calcination thereof.

EXAMPLE 3

A catalyst precursor was prepared according to Example 1 except that the dried impregnated material was stored in a dry environment at ambient temperature for 15 hours after each subsequent impregnation step, before calcination thereof.

Figure 1:
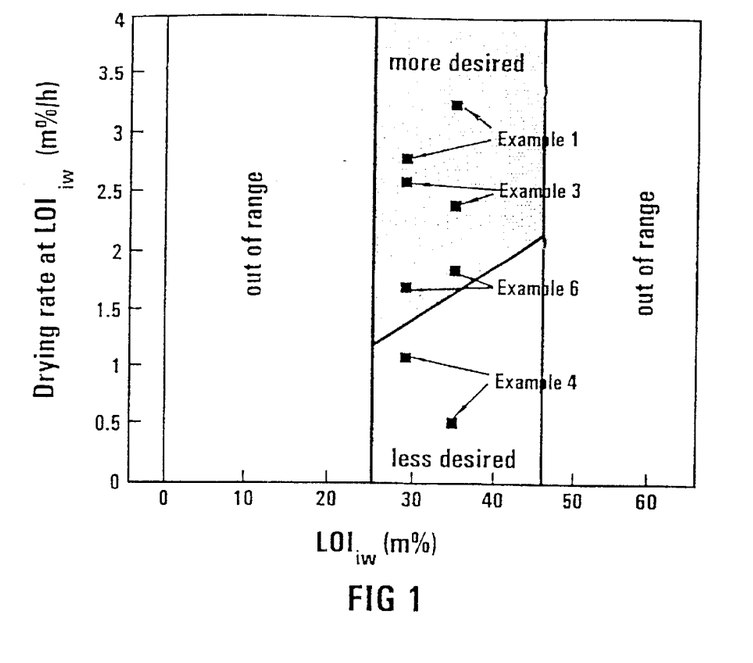
FIG. 1 shows a plot of the drying rate at the point of incipient wetness against $LOI_{iw}$ for some of the catalysts of the Examples described hereinafter.
Figure 2:
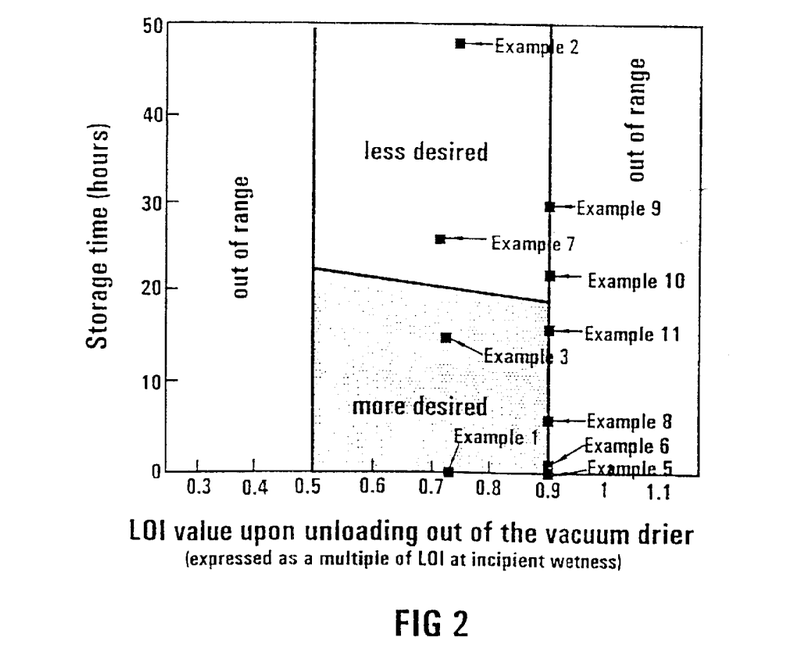
FIG. 2 shows a plot of storage time vs LOI on unloading, again in respect of some of the catalysts of the Examples.
Figure 3A:
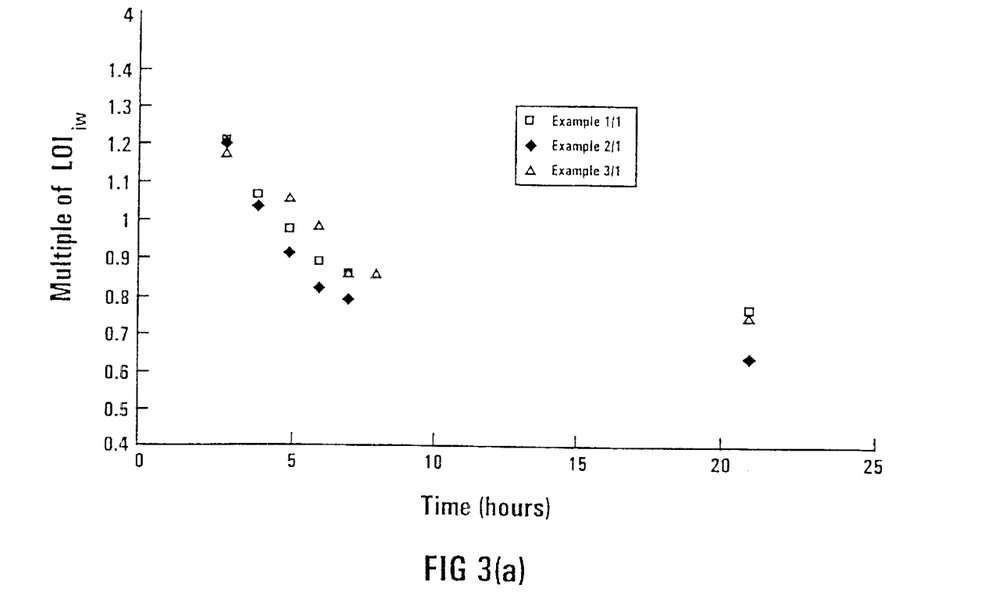
FIGS. 3a and 3b show drying profiles of the catalysts of Examples 1, 2 and 3 during the first and second Co impregnation and drying steps respectively.
Figure 3B:
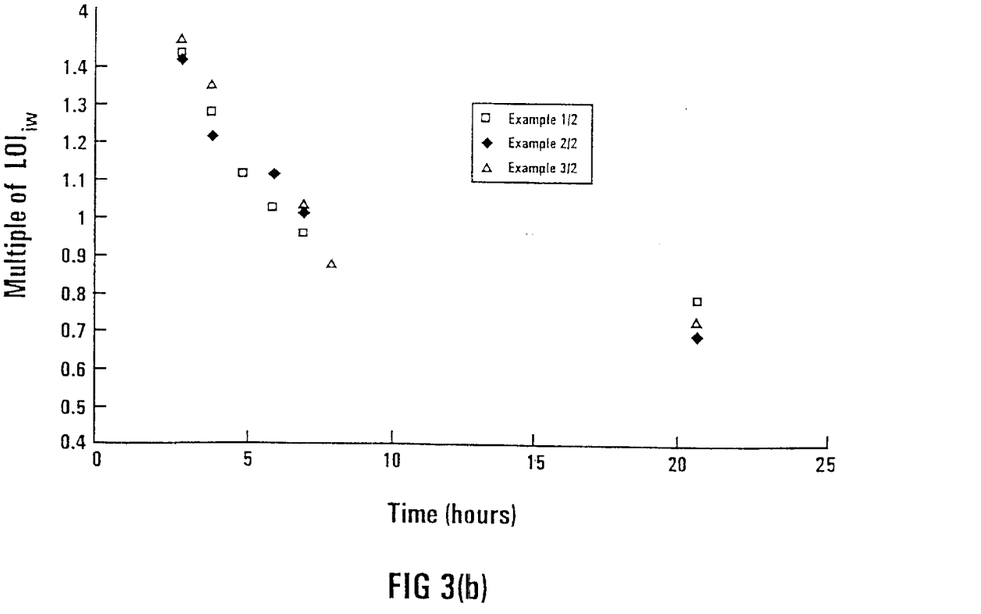

The drying profiles of the catalyst precursors in Examples 1 to 3 are shown in FIGS. 3a and 3b. The calculated slopes, ie the drying rates, are presented in Table 3, and are shown in FIG. 1 as a function of the $LOI_{iw}$.

TABLE 3

The tangent of the drying profile at the point of incipient wetness. The inscription 'Example X/1' means: Example X.after impregnation step 1.

| Catalyst Precursor | Slope (m %/h) |
|---|---|
| Example 1/1 | 3.25 |
| Example 2/1 | 4.18 |
| Example 3/1 | 2.40 |
| Example 4/1 | 0.51 |
| Example 1/2 | 2.9 |
| Example 2/2 | 1.95 |
| Example 3/2 | 2.59 |
| Example 4/2 | 1.11 |

Between 10 and 30 grams catalyst, ie properly externally reduced catalyst precursors of Examples 1 to 3, ranging between 38 and 150 micron, were suspended in 300 ml molten wax and loaded in a CSTR with an internal volume of 500 ml. The feed gas consisted of hydrogen and carbon monoxide in a $H_2/CO$ molar ratio from 1.5/1 to 2.3/1. This reactor was electrically heated and sufficiently high stirrer speeds were employed so as to eliminate any gas-liquid mass transfer limitations. The feed flow was controlled by means of Brooks mass flow controllers, and space velocities ranging from 2 to 4 $m^3_n/(h.kg$ catalyst) were used. GC analyses of the permanent gases as well as the volatile overhead hydrocarbons were used in order to characterize the product spectra.

All catalyst precursors were reduced prior to synthesis in a tubular reactor at a pure hydrogen space velocity of 2500 h$^{-1}$ and atmospheric pressure. The temperature was increased from room temperature to 350° C. to 425° C. at a rate of 1° C./min, after which isothermal conditions were maintained for 6 to 16 hours.

Fischer-Tropsch slurry phase synthesis performance results are shown in Table 4.

TABLE 4

Fischer-Tropsch slurry phase synthesis results

| run analysis | Example 1 233$ | Example 2 242$ | Example 3 265$ |
|---|---|---|---|
| Synthesis conditions | | | |
| Calcined catalyst mass (g) | 22.1 | 21.1 | 20.7 |
| Reactor temperature (° C.) | 221 | 222 | 220 |
| Reactor pressure (bar) | 20.5 | 20.0 | 20.3 |
| Time on stream (h) | 15.5 | 15.0 | 15.3 |
| Feed gas composition: | | | |
| $H_2$ (vol %) | 54.6 | 54.1 | 55.5 |
| CO (vol %) | 28.35 | 28.4 | 27.5 |
| $CO_2$ (vol %) | 0.58 | 0.56 | 0.50 |
| Syngas ($H_2$ + CO) space velocity ($m^3_n$/kg cat/h) | 2.5 | 2.4 | 2.4 |
| Reactor partial pressures | | | |
| $H_2$ (bar) | 4.0 | 4.9 | 3.9 |
| CO (bar) | 2.4 | 2.9 | 2.3 |
| $H_2O$ (bar) | 6.2 | 5.1 | 6.1 |
| $CO_2$ (bar) | 0.4 | 0.3 | 0.3 |
| Synthesis performance | | | |
| Conversion: % syngas | 76.0 | 67.7 | 76.8 |
| Relative intrinsic specific Fischer-Tropsch activity | 1.00 | 0.75 | 1.04 |
| % C-atom $CH_4$ selectivity | 3.3 | 4.8 | 3.4 |
| % CO of total amount of CO converted to $CO_2$ | 3.7 | 2.3 | 3.9 |

Having applied a reported cobalt based Fischer-Tropsch kinetic equation, such as:

$$r_{FT}=(k_{FT}P_{H2}P_{CO})/(1+KP_{CO})^2$$

the Arrhenius derived pre-exponential factor of $k_{FT}$ was estimated for each of the reported runs. The relative intrinsic specific Fischer-Tropsch activity is defined as (pre-exponential factor of catalyst z)/(pre-exponential factor of catalyst of Example 1/2), in which catalyst z can be the catalyst of Example 2/2, 3/2, or 4/2.

The more desired relative intrinsic Fischer-Tropsch activity is $\geq 0.93$, and subsequently the less desired relative intrinsic Fischer-Tropsch activity is <0.93.

EXAMPLE 4

A catalyst precursor was prepared according to Example 1 except that there was no stirring during the first and second impregnation steps.

Figure 4A:
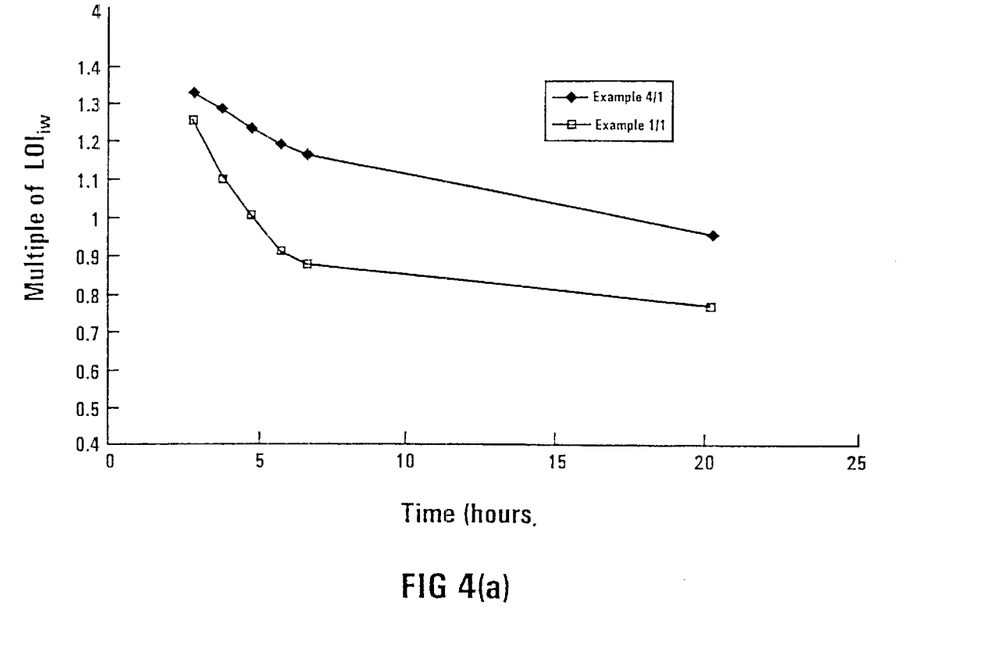
FIGS. 4a and 4b show the drying profiles of the catalysts of Examples 1 and 4 during the first and second Co impregnation and drying steps respectively.
Figure 4B:
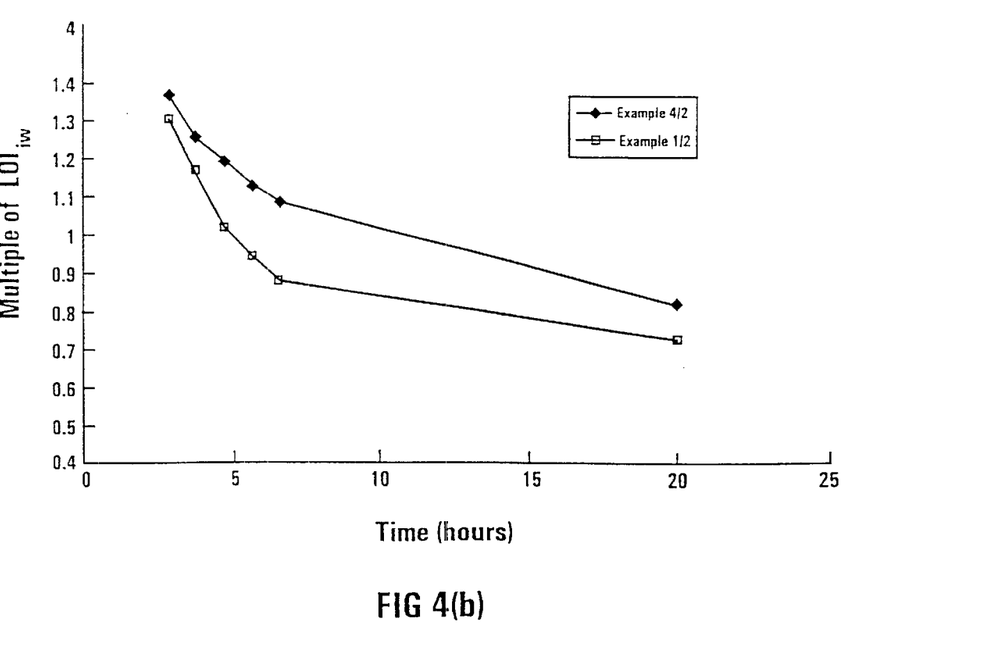

The drying profiles of Examples 1 and 4 can be seen in FIGS. 4a and 4b. The calculated slopes are given in Table 3, and shown, as function of the $LOI_{iw}$, in FIG. 1.

After preparation and calcination, the catalyst precursors were reduced and the Fischer-Tropsch synthesis of the resultant catalysts determined, according to the procedures described hereinbefore. The Fischer-Tropsch synthesis results of these catalysts are given in Table 5.

TABLE 5

Fischer-Tropsch slurry phase synthesis results

| run analysis | Example 1 233$ | Example 4 243$ |
|---|---|---|
| Synthesis conditions | | |
| Calcined catalyst mass (g) | 22.1 | 21.7 |
| Reactor temperature (° C.) | 221 | 222 |
| Reactor pressure (bar) | 20.5 | 19.8 |
| Time on stream (h) | 15.5 | 15.5 |
| Feed gas composition: | | |
| $H_2$ (vol %) | 54.6 | 54.4 |
| CO (vol %) | 28.5 | 28.0 |
| $CO_2$ (vol %) | 0.58 | 0.50 |
| Syngas ($H_2$ + CO) space velocity ($m^3_n$/kg cat/h) | 2.5 | 2.4 |
| Reactor partial pressures | | |
| $H_2$ (bar) | 4.0 | 10.0 |
| CO (bar) | 2.4 | 5.0 |
| $H_2O$ (bar) | 6.2 | 0.8 |
| $CO_2$ (bar) | 0.4 | 0.1 |
| Synthesis performance | | |
| Conversion: % syngas | 76.0 | 12.9 |
| Relative intrinsic specific Fischer-Tropsch activity | 1.00 | 0.11 |
| % C-atom $CH_4$ selectivity | 3.3 | 12.7 |
| % CO of total amount of CO converted to $CO_2$ | 3.7 | 1.2 |

EXAMPLE 5

A catalyst precursor was prepared according to Example 1, except that the dried impregnated material was unloaded during the first impregnation step at an LOI of 31%, ie 0.89$LOI_{iw}$. After unloading, the dried impregnated material was calcined immediately at 250° C. During the second impregnation step, the dried impregnated material was unloaded at a LOI of 26%, ie 0.90$LOI_{iw}$. After unloading, the dried impregnated material was calcined immediately at 250° C.

EXAMPLE 6

An alumina supported cobalt catalyst precursor was prepared according to the process of the invention. A solution of 221.13 kg of $Co(NO_3)_2 \cdot 6H_2O$, 121.5 g of $(NH_3)_4Pt(NO_3)_2$, and 180.91 kg of distilled water was mixed with 270.0 kg of a gamma alumina support (Condea SCCa 5/150, pore volume of 0.45 ml/g, from Condea Chemie GmbH of Uberseering 40, 22297 Hamburg, Germany) by adding the support to the solution. In a first impregnation step, the slurry was added to a conical vacuum drier and continuously mixed. The temperature of this slurry was increased to 60° C. and a vacuum of 20 kPa was applied. During the first 3 hours of drying, ie during an initial treatment stage, the temperature was increased slowly and reached 95° C. after 3 hours. The $LOI_{iw}$ can be calculated by using equation 1, and applying 0,45 (ml/g) for x and 0.82 (g $Co(NO_3)_2 \cdot 6H_2O$ per gram alumina) for M. This results in a $LOI_{iw}$ of 33%. The LOI value was determined as described in Example 1. The LOI after 3 hours was 41.8%, ie 1.28$LOI_{iw}$. Thereafter, during a subsequent treatment stage, the pressure was decreased to 12 kPa(a) and after 8 hours, as determined from the start of the initial treatment stage, the LOI was found to be 30.5%, ie 0.9$LOI_{iw}$. The dried impregnated material was calcined at 250° C. after a 1 hour waiting time between terminating the subsequent treatment stage and starting the calcination stage. To obtain a catalyst precursor with a cobalt loading of 30 g CO/100 g $Al_2O_3$, a second impregnation step was performed. A solution of 171.24 kg of $Co(NO_3)_2 \cdot 6H_2O$, 269,2 g of $(NH_3)_4Pt(NO_3)_2$, and 240.1 kg of distilled water was mixed with 330 kg of the calcined material from the first impregnation step, by adding the calcined material to the solution. The temperature of this slurry was increased to 60° C. and a vacuum of 20 kPa was applied. The $LOI_{iw}$ can again be calculated by using Equation 1, and applying 0.35 (ml/g) for x and 0.52 (g $Co(NO_3)_2 \cdot 6H_2O$ per gram alumina) for M. This results in a $LOI_{iw}$ of 28%. During the first 3 hours of drying, ie during an initial treatment stage of the second impregnation step, the temperature was increased slowly and reached 95° C. after 3 hours. The LOI after 3 hours was 38.5%, ie 1.38 $LOI_{iw}$. Thereafter, during a subsequent treatment stage of the second impregnation step, the pressure was decreased to 12 kPa(a), and after 7 hours, as determined from the start of the initial treatment stage of the second impregnation step, the LOI was found to be 25.0%, ie 0.89$LOI_{iw}$. The dried impregnated material was calcined at 250° C. after a 1 hour waiting time between terminating the subsequent treatment stage and starting the calcination.

EXAMPLE 7

A catalyst precursor was prepared according to Example 1 except that the dried impregnated material was stored in a dry environment at ambient temperature for 26 hours after the subsequent treatment stage of the second impregnation step, before calcination thereof.

EXAMPLE 8

An alumina supported cobalt catalyst precursor was prepared according to the process of the invention. A solution of 17.4 kg of $Co(NO_3)_2 \cdot 6H_2O$, 9.6 g of $(NH_3)_4Pt(NO_3)_2$, and 11 kg of distilled water was mixed with 20.0 kg of a gamma alumina support (Condea SCCa 5/150, pore volume of 0.48 ml/g, from Condea Chemie GmbH of Uberseering 40, 22297 Hamburg, Germany) by adding the support to the solution. In a first impregnation step, the slurry was added to a conical vacuum drier and continuously mixed. The temperature of this slurry was increased to 60° C. and a vacuum of 20 kPa was applied. During the first 3 hours of drying, ie during an initial treatment stage, the temperature was increased slowly and reached 95° C. after 3 hours. The $LOI_{iw}$ can be calculated by using Equation 1, and applying 0.48 (ml/g) for x and 0.87 (g $Co(NO_3)_2 \cdot 6H_2O$ per gram alumina) for M. This results in a $LOI_{iw}$ of 35%. The LOI after 3 hours was 42.1%, ie 1.20$LOI_{iw}$. Thereafter, during a subsequent treatment stage, the pressure was decreased to 7 kPa(a), and after 7 hours, as determined from the start of the initial treatment stage the LOI was found to be 29.5%, ie 0.84$LOI_{iw}$. The dried impregnated material was calcined immediately at 250° C. To obtain a catalyst precursor with a cobalt loading of 30 g Co/100 g $Al_2O_3$, a second impregnation step was performed. A solution of 9.4 kg of $Co(NO_3)_2 \cdot 6H_2O$, 15.7 g of $(NH_3)_4Pt(NO_3)_2$, and 15.1 kg of distilled water was mixed with 20.0 kg of calcined material from the first impregnation step, by adding the calcined material to the solution. The temperature of this slurry was increased to 60° C. and a vacuum of 20 kPa was applied. The $LOI_{iw}$ can again be calculated by using Equation 1, and applying 0.36 (ml/g) for x and 0.47 (g $Co(NO_3)_2 \cdot 6H_2O$ per gram alumina) for M. This results in a $LOI_{iw}$ of 29%. During the first 3 hours of drying, ie during an initial treatment stage of the second impregnation step, the temperature was increased slowly and reached 95° C. after 3 hours. The LOI after 3 hours was 37.0%, ie 1.28$LOI_{iw}$. Thereafter, during a subsequent treatment stage of the second impregnation step, the pressure was decreased to 7 kPa(a), and after 7 hours, as determined from the start of the initial treatment stage of the second impregnation step, the LOI was found to be 25.0%, ie 0.86$LOI_{iw}$. The impregnated and dried material was then stored in a dry environment at ambient temperature for 6 hours before calcination thereof.

EXAMPLE 9

A catalyst precursor was prepared according to Example 8 except that the dried impregnated material was stored in a dry environment at ambient temperature for 35 hours after the subsequent treatment stage of the second impregnation step, before calcination thereof.

EXAMPLE 10

A catalyst precursor was prepared according to Example 8 except that the dried impregnated material was stored in a dry environment at ambient temperature for 16 hours after the subsequent treatment stage of the second impregnation step, and before calcination thereof.

EXAMPLE 11

A catalyst precursor was prepared according to Example 8 except that the dried impregnated material was stored in a dry environment at ambient temperature for 22 hours after the subsequent treatment stage of the second impregnation step, and before calcination thereof.

After preparation and calcination, the catalyst precursors of Examples 6 to 11 were reduced to obtain catalysts, and the Fischer-Tropsch intrinsic activity of these catalysts determined, according to the procedures described hereinbefore. The Fischer-Tropsch synthesis results of these catalysts are given in Tables 6 and 7.

TABLE 6

Fischer-Tropsch slurry phase synthesis results

| Run analysis | Example 6 196F | Example 7 233F | Example 8 237F |
|---|---|---|---|
| Synthesis conditions | | | |
| Calcined catalyst mass (g) | 20.7 | 21.9 | 18.4 |
| Reactor temperature (° C.) | 220 | 221 | 221 |
| Reactor pressure (bar) | 20.2 | 20.2 | 19.9 |
| Time on stream (h) | 15.0 | 15.0 | 15.0 |
| Feed gas composition: | | | |
| $H_2$ (vol %) | 53.7 | 53.9 | 55.2 |
| CO (vol %) | 27.8 | 27.7 | 26.4 |
| $CO_2$ (vol %) | 0.47 | 0.54 | 0.53 |
| Syngas ($H_2$ + CO) space velocity ($m^3_n$/kg cat/h) | 4.1 | 4.0 | 4.2 |
| Reactor partial pressures | | | |
| $H_2$ (bar) | 6.2 | 6.5 | 6.5 |
| CO (bar) | 3.2 | 3.4 | 3.1 |
| $H_2O$ (bar) | 4.2 | 3.9 | 3.9 |
| $CO_2$ (bar) | 0.2 | 1.2 | 0.2 |
| Synthesis performance | | | |
| Conversion: % syngas | 57.4 | 54.9 | 56.2 |
| Relative intrinsic specific Fischer-Tropsch activity | 1.00 | 0.90 | 0.93 |
| % C-atom $CH_4$ selectivity | 1.6 | 4.7 | 5.9 |

TABLE 6-continued

Fischer-Tropsch slurry phase synthesis results

| Run analysis | Example 6 196F | Example 7 233F | Example 8 237F |
|---|---|---|---|
| Absolute WGS reaction rate (mol CO converted to $CO_2$/(g cat.s)) | $1.7 \times 10^{-7}$ | $1.2 \times 10^{-7}$ | $1.6 \times 10^{-7}$ |
| Absolute FT reaction rate (mol CO converted to HC/(g cats) | $9.76 \times 10^{-6}$ | $9.16 \times 10^{-6}$ | $9.81 \times 10^{-6}$ |
| % CO of total amount of CO converted to $CO_2$ | 1.7 | 1.3 | 1.6 |

TABLE 7

Fischer-Tropsch slurry phase synthesis results

| Run analysis | Example 9 224F | Example 10 229F | Example 11 239F |
|---|---|---|---|
| Synthesis conditions | | | |
| Calcined catalyst mass (g) | 20.0 | 20.3 | 17.1 |
| Reactor temperature (° C.) | 221 | 220 | 221 |
| Reactor pressure (bar) | 20.0 | 20.0 | 20.0 |
| Time on stream (h) | 15.0 | 15.0 | 15.0 |
| Feed gas composition: | | | |
| $H_2$ (vol %) | 54.6 | 53.8 | 52.7 |
| CO (vol %) | 26.8 | 2.7 | 27.6 |
| $CO_2$ (vol %) | 0.61 | 0.36 | 0.56 |
| Syngas ($H_2$ + CO) space velocity ($m^3_n$/kg cat/h) | 4.1 | 3.9 | 4.1 |
| Reactor partial pressures | | | |
| $H_2$ (bar) | 6.5 | 7.2 | 6,0 |
| CO (bar) | 3.2 | 3.6 | 3,0 |
| $H_2O$ (bar) | 3.9 | 3.2 | 4,2 |
| $CO_2$ (bar) | 0.2 | 0.2 | 0,2 |
| Synthesis performance | | | |
| Conversion: % syngas | 55.6 | 47.6 | 57.4 |
| Relative intrinsic specific Fischer-Tropsch activity | 0.86 | 0.71 | 0.93 |
| % C-atom $CH_4$ selectivity | 5.0 | 8.3 | 6.7 |
| Absolute WGS reaction rate (mol CO converted to $CO_2$/(g cats)) | $1.3 \times 10^{-7}$ | $1.3 \times 10^{-7}$ | $1.4 \times 10^{-7}$ |
| Absolute FT reaction rate (mol CO converted to HC/(g cat.s) | $9.44 \times 10^{-6}$ | $7.67 \times 10^{-6}$ | $9.61 \times 10^{-6}$ |
| % CO of total amount of CO converted to $CO_2$ | 1.4 | 1.7 | 1.4 |

Fischer-Tropsch synthesis is the conversion of synthesis gas to higher hydrocarbons, eg petrol, diesel, wax. Synthesis gas, ie a gas mixture with hydrogen and carbon monoxide as the main components, can be produced from natural gas by processes well known to those skilled in the art, for example autothermal reforming or partial oxidation of natural gas. The Fischer-Tropsch synthesis process can be performed by using iron, nickel, cobalt, or ruthenium based catalysts. The catalysts can be used in fixed, slurry, and fluidized bed Fischer-Tropsch applications. It is known that supported cobalt based slurry phase Fischer-Tropsch catalysts produce a wax product. This wax product can be used as such, or it can, for example, be hydrocracked to petrol and diesel by processes known in the art.

It has hitherto generally been held by persons skilled in the art that, in supported catalysts for Fischer-Tropsch synthesis, only the catalyst composition is important for catalyst performance, and that any catalyst support impregnation method can be used, ie that the catalyst preparation procedure is not critical.

However, a serious problem encountered with catalysts made according to known methods is that the catalyst do not show the same activity in a micro CSTR reactor if the impregnated material was not dried with the same efficiency or if there was a waiting period between the drying of the impregnated material and the calcination thereof.

The Applicant has thus surprisingly found that by optimizing the drying procedure through ensuring that a particular drying profile is met during impregnation and drying and that, if a waiting period was required, the impregnated material is further dried to a set specification and the dried material is calcined within a set period of time, uniform catalysts of acceptable activities can be prepared.

The present invention thus involves the optimization of a drying procedure for the preparation of a catalyst precursor from which can be obtained a catalyst with excellent Fischer-Tropsch synthesis behaviour and resulting in high activity. More particularly, this invention provides efficient drying of the impregnated material during catalyst precursor preparation, and once dried, the excellent properties of the catalyst introduced during drying are maintained until the calcination thereof.

What is claimed is:

1. A process for preparing a catalyst precursor, which process comprises subjecting, in an initial treatment stage, a slurry comprising a porous oxidic catalyst support or carrier, an active catalyst component or its precursor, and water, to treatment at a temperature $T_1$ where $60° C. \leq T_1 \leq 95° C.$ and at a sub-atmospheric pressure $P_1$ where $P_1$ ranges from atmospheric pressure $>P_1 \geq 20$ kPa(a) when $T_1=60° C.$ to atmospheric pressure $>P_1 \geq 83$ kPa (a) when $T_1=95° C.$, such that impregnation of the support or carrier with the active catalyst component or its precursor and partial drying of the impregnated support or carrier occurs, with the initial treatment stage not continuing beyond a point where the impregnated carrier or support has a loss on ignition (LOI) which is less than 1.2 times its loss on ignition at incipient wetness ($LOI_{iw}$);

thereafter, in a subsequent treatment stage, subjecting the partially dried impregnated support or carrier to treatment at a temperature $T_2$ and at a sub-atmospheric pressure $P_2$ such that $60° C. < T_2 \leq 95° C.$ and $T_2 > T_1$ and/or $P_2 < 20$ kPa(a) and $P_2 < P_1$, thereby to obtain more vigorous drying of the impregnated support or carrier in the subsequent treatment stage than in the initial treatment stage, with a dried impregnated carrier or support thereby being produced; and calcining the dried impregnated carrier or support, to obtain the catalyst precursor.

2. A process according to claim 1, wherein the porous oxidic catalyst support is particulate alumina which has an average pore diameter between 8 and 50 nanometers, a pore volume between 0.1 and 1 ml/g, and an average particle size between 1 and 500 micrometers; wherein cobalt nitrate, $Co(NO_3)_2 \cdot 6H_2O$, is used as an active catalyst component precursor; wherein from 1.18xy to 1.82xy kg Co $(NO_3)_2 \cdot 6H_2O$ is used in the initial treatment stage, where x is the BET pore volume of the alumina support in ml/g, and y is the mass of alumina support to be impregnated, in kg; and which includes initially dissolving the $Co(NO_3)_2 \cdot 6H_2O$ in the water, with sufficient water being used such that the volume of the solution is $>xy$; heating the solution to a temperature between 60° C. and 95° C.; adding the support to the solution at atmospheric pressure, to form the slurry, and continuously mixing the slurry.

3. A process according to claim 2, wherein, in the initial treatment stage, vacuum is gradually applied to the slurry, under continuous mixing thereof, with 60° C.$\leq T_1 \leq$95° C., and with atmospheric pressure>$P_1 \geq$20 kPa(a); wherein the initial treatment stage is continued until the loss on ignition (LOI) of the impregnated alumina support is 1.2 times $LOI_{iw}$; and wherein, when the LOI of the impregnated alumina support is 1.2 times $LOI_{iw}$, increased evacuation is applied in the subsequent treatment stage so that $P_2<P_1$, while ensuring that the support temperature is controlled between 60° C. and 95° C., under continuous mixing, so that more forceful drying of the impregnated support takes place during the subsequent treatment stage.

4. A process according to claim 3, wherein the more forceful vacuum drying during the subsequent treatment stage proceeds in an uninterrupted fashion at the minimum pressure $P_2$ which is attainable, with the vacuum drying under these conditions being maintained until a clearly defined maximum LOI value is reached, with this maximum LOI value being smaller than, or equal to, 0.90 times $LOI_{iw}$; and which includes, during the subsequent treatment stage, controlling the drying rate of the slurry by controlling the sub-atmospheric pressure $P_2$, by controlling or adjusting the degree of mixing, by controlling or adjusting the treatment temperature $T_2$ and/or by introducing hot air into the slurry.

5. A process according to claim 4, wherein, during the subsequent treatment stage, the drying rate is controlled such that, at the point of incipient wetness, the drying rate is greater than $(0.048\ h^{-1})\ LOI_{iw}$; and which includes storing the dried impregnated carrier or support from the subsequent treatment stage at ambient conditions ina dry environment before calcination thereof, with the storage time being less than $((-8.1/LOI_{iw})LOI_{unload}+26.2)$ hours, where $LOI_{unload}$ is the LOI at which the subsequent treatment stage is terminated.

6. A process according to claim 2, wherein the calcination of the dried impregnated support is effected in a fluidized bed calciner, or in a rotary kiln calciner, at a temperature from 200° C. to 300° C.; and/or wherein sufficient cobalt nitrate is initially used to obtain a cobalt loading between 5 g Co/100 g support and 70 g Co/100 g support.

7. A process according to claim 2, wherein, in order to obtain an increased cobalt loading of the alumina support, the calcined material is subjected to further impregnation, drying and calcination in a second impregnation step, with the initial treatment stage, the subsequent treatment stage, and the calcination thus constituting a first impregnation step.

8. A process according to claim 7, wherein the second impregnation step comprises subjecting, in an initial treatment stage, a slurry comprising the calcined material of the first impregnation step; cobalt as an active catalyst component, or a precursor thereof; and water, to treatment at a temperature $T_1'$ where 60° C.$\leq T_1' \leq$95° C. and at a sub-atmospheric pressure $P_1'$ where $P_1'$ ranges from atmospheric pressure>$P_1' \geq$20 kPa(a) when $T_1'$=60° C. to atmospheric pressure>$P_1' \geq$84 kPa(a) when $T_1'$=95° C., such that impregnation of the calcined material with the active catalyst component or its precursor and partial drying of the impregnated material occurs, with the initial treatment stage not continuing beyond a point where the impregnated material has a LOI which is less than 1.2 times its $LOI_{iw}$;

thereafter, in a subsequent treatment stage, subjecting the partially dried impregnated material to treatment at a temperature $T_2'$ and at a sub-atmospheric pressure $P_2$ such that 60° C.<$T_2' \leq$95° C. and $T_2'>T_1'$ and/or $P_2'<20$ kPa(a) and $P_2'<P_1'$, thereby to obtain more vigorous drying of the impregnated material in the subsequent treatment stage than in the initial treatment stage, with a dried impregnated material thereby being produced; and calcining the dried impregnated material, to obtain the catalyst precursor.

9. A process according to claim 8, wherein cobalt nitrate, $Co(NO_3)_2 \cdot 6H_2O$, is used as an active catalyst component precursor in the second impregnation step, and wherein from $1.18x_1y_1$ to $1.82x_1y_1$ kg $Co(NO_3)_2 \cdot 6H_2O$ is used in the initial treatment stage of the second impregnation step where $x_1$ is the BET pore volume of the calcined material from the first impregnation step, in ml/g, and $y_1$ is the mass of calcined material from the first impregnation step to be impregnated in the second impregnation step, in kg, with the proviso that the amount of $Co(NO_3)_2 \cdot 6H_2O$ used in the second impregnation step, is adjusted in the event that the maximum amount of $Co(NO_3)_2 \cdot 6H_2O$, as determined by the formula $1.82x_1y_1$, results in a desired cobalt loading of the catalyst precursor being exceeded; and which includes, in the second impregnation step, initially dissolving the $Co(NO_3)_2 \cdot 6H_2O$ in water, with sufficient water being used such that the volume of the solution is >$x_1y_1$l, heating the solution to a temperature between 60 and 95° C., adding the final inventory of $y_1$ kg of the calcined material from the first impregnation step to this solution at atmospheric pressure, to form the slurry, and continuously mixing the slurry.

10. A process according to claim 9, wherein, in the initial treatment stage of the second impregnation step, vacuum is gradually applied to the slurry, under continuous mixing thereof, with 60° C.$\leq T_1' \leq$95EC, and with atmospheric pressure>$P_1' \geq$20 kPa(a); wherein the initial treatment stage of the second impregnation step is continued until the loss on ignition ('LOI') of the impregnated material is 1.2 times $LOI_{iw}$; and wherein, when the LOI of the impregnated material is 1.2 times $LOI_{iw}$, increased evacuation is applied in the subsequent treatment stage of the second impregnation step so that $P_2'<P_1'$, while ensuring that the partially dried impregnation material temperature is controlled between 60° C. and 95° C., under continuous mixing, so that more forceful drying of the impregnated material takes place during the subsequent treatment stage.

11. A process according to claim 10, wherein the more forceful vacuum drying during the subsequent treatment stage proceeds in an uninterrupted fashion at the minimum pressure which is attainable, with vacuum drying under these conditions being maintained until a clearly defined maximum LOI value is reached, with this maximum LOI value being smaller than, or equal to, 0.90 times $LOI_{iw}$; and which includes, during the subsequent treatment stage, controlling the drying rate of the slurry by controlling the sub-atmospheric pressure $P_2'$, by controlling or adjusting the degree of mixing, by controlling or adjusting the treatment temperature $T_2'$ and/or by introducing hot air into the slurry.

12. A process according to claim 11, wherein, during the subsequent treatment stage, the drying rate is controlled such that, at the point of incipient wetness, the drying rate is greater than $(0.048\ h^{-1})\ LOI_{iw}$; and which includes storing the dried impregnated carrier or support from the subsequent treatment stage at ambient conditions in a dry environment before calcination thereof, with the storage time being less than $((-8.1/LOI_{iw})LOI_{unload}+26.2)$ hours, where $LOI_{unload}$ is the LOI at which the subsequent treatment stage is terminated.

13. A process according to claim 9, wherein the calcination of the dried impregnated material is effected in a fluidized bed calciner, or in a rotary kiln calciner, at a temperature from 200° C. to 300° C.; and/or wherein, during the first treatment stage of the first impregnation step and/or during the first treatment stage of the second impregnation step, a water soluble precursor salt of palladium, Pd, or platinum, Pt, is added, as a dopant capable of enhancing the reducibility of the active component, with the mass proportion of the palladium or the platinum metal to the cobalt metal being between 0.01:100 to 0.3:100.

14. A process according to claim 2, wherein from 1.18xy to 1.82xy kg $Co(NO_3)_2 \cdot 6H_2O$ is used in the initial treatment stage, where x is the BET pore volume of the alumina support in ml/g, and y is the mass of alumina support to be impregnated, in kg and which includes initially dissolving the $Co(NO_3)_2 \cdot 6H_2O$ in the water, with sufficient water being used such that the volume of the solution is >xyl; adding the support to the solution at ambient temperature to form the slurry, and thereafter heating the slurry to the elevated temperature which is from 60° C. to 95° C., with the sub-atmospheric pressure or vacuum that is applied during the initial treatment stage being down to 20 kPa(a).

* * * * *